(12) United States Patent
Hartenstine et al.

(10) Patent No.: US 6,666,473 B2
(45) Date of Patent: Dec. 23, 2003

(54) FOLDABLE STROLLER WITH PASSENGER SUPPORT BASE

(75) Inventors: Curtis M. Hartenstine, Birdsboro, PA (US); Peter Tuckey, Morgantown, PA (US)

(73) Assignee: Graco Children's Products Inc., Exton, PA (US)

(*) Notice: Subject to any disclaimer, the term of this patent is extended or adjusted under 35 U.S.C. 154(b) by 27 days.

(21) Appl. No.: 09/850,163

(22) Filed: May 8, 2001

(65) Prior Publication Data

US 2002/0005628 A1 Jan. 17, 2002

Related U.S. Application Data

(63) Continuation-in-part of application No. 09/567,096, filed on May 8, 2000, now Pat. No. 6,478,327.

(51) Int. Cl.[7] .................................................. B62B 1/00
(52) U.S. Cl. ....................... 280/647; 280/642; 280/650; 297/256.16
(58) Field of Search ................................ 280/647, 641, 280/642, 648, 650, 639, 654, 657, 658, 47.38; 297/256.16, 256.15, 256.17

(56) References Cited

U.S. PATENT DOCUMENTS

| | | | |
|---|---|---|---|
| 2,616,719 A | 11/1952 | Heideman | |
| 2,783,053 A | 2/1957 | Sheldrick et al. | |
| 3,112,042 A | 11/1963 | Leshner | |
| 3,168,330 A | 2/1965 | Smith et al. | |
| 3,459,435 A | 8/1969 | Garner | |
| 3,504,926 A | 4/1970 | Glaser | |
| 3,556,546 A | 1/1971 | Garner | |
| 4,023,825 A | 5/1977 | Kassai | |
| 4,046,401 A | 9/1977 | Kassai | |
| 4,111,454 A | 9/1978 | Kassai | |
| 4,126,331 A | 11/1978 | Sloan et al. | |
| 4,186,961 A | * 2/1980 | Farrell et al. | 297/256.15 |
| 4,191,397 A | 3/1980 | Kassai | |
| 4,232,897 A | 11/1980 | Maclaren et al. | |
| 4,248,443 A | 2/1981 | Ohlson | |
| 4,317,581 A | 3/1982 | Kassai | |
| 4,335,900 A | 6/1982 | Fleischer | |
| 4,362,315 A | 12/1982 | Kassai | |
| 4,412,688 A | 11/1983 | Giordani | |
| 4,415,180 A | 11/1983 | Payne, Jr. | |
| 4,542,915 A | 9/1985 | Wheeler, III et al. | |
| 4,564,212 A | 1/1986 | Orlandino et al. | |
| 4,606,550 A | 8/1986 | Cone | |

(List continued on next page.)

FOREIGN PATENT DOCUMENTS

| | | |
|---|---|---|
| DE | 198 33 857 A1 | 2/1999 |
| DE | 299 10 986 U1 | 10/1999 |
| EP | 0 901 953 A2 | 3/1999 |
| EP | 0 994 004 A2 | 4/2000 |
| WO | WO 00/06437 | 2/2000 |

OTHER PUBLICATIONS

Maxi–Cosi car seat available pre–May 8, 2000, 10 pages of photographs.

Primary Examiner—Brian L. Johnson
Assistant Examiner—Hau Phan
(74) Attorney, Agent, or Firm—Foley & Lardner

(57) ABSTRACT

A child seat structure for attachment to a stroller frame includes a child seat having a seat cushion and a seat back support. The seat cushion has a front portion with at least one tab affixed thereto. The child seat structure also includes a passenger support base attachable to the stroller frame. The passenger support base has a trough and at least one opening through the trough. The passenger support base also has at least one projection thereon, such that the tab can pass through the opening and connect to the projection to secure the front portion of the seat cushion in the trough of the passenger support base.

5 Claims, 12 Drawing Sheets

U.S. PATENT DOCUMENTS

| | | |
|---|---|---|
| 4,610,460 A | 9/1986 | Kassai |
| 4,632,420 A | 12/1986 | Miyagi |
| 4,632,421 A | 12/1986 | Shamie |
| 4,660,850 A | 4/1987 | Nakao et al. |
| 4,706,986 A | 11/1987 | Kassai |
| 4,741,056 A | 5/1988 | Kassai |
| 4,741,551 A | 5/1988 | Perego |
| 4,763,911 A | 8/1988 | Gebhard et al. |
| 4,763,919 A | 8/1988 | Nakao et al. |
| 4,768,795 A | 9/1988 | Mar |
| 4,770,437 A | 9/1988 | Glaser |
| 4,817,982 A | 4/1989 | Kassai |
| 4,819,958 A | 4/1989 | Perego |
| 4,832,361 A | 5/1989 | Nakao et al. |
| 4,856,809 A | 8/1989 | Kohus et al. |
| 4,886,289 A | 12/1989 | Yee et al. |
| 4,892,327 A | 1/1990 | Cabagnero |
| 4,907,818 A | 3/1990 | Chai |
| 4,924,725 A | 5/1990 | Takahashi et al. |
| 4,930,697 A | 6/1990 | Takahashi et al. |
| 4,953,887 A | 9/1990 | Takahashi et al. |
| 5,056,805 A | 10/1991 | Wang |
| 5,074,575 A | 12/1991 | Bigo |
| 5,087,066 A | 2/1992 | Mong-Hsing |
| 5,110,150 A | 5/1992 | Chen |
| 5,143,398 A | 9/1992 | Teng |
| 5,181,735 A | 1/1993 | Onishi |
| 5,184,835 A | 2/1993 | Huang |
| 5,201,535 A | 4/1993 | Kato et al. |
| 5,205,577 A | 4/1993 | Liu |
| 5,244,228 A | 9/1993 | Chiu |
| 5,246,272 A | 9/1993 | Kato et al. |
| 5,257,799 A | 11/1993 | Cone et al. |
| 5,362,089 A | 11/1994 | Jyan-Tsai |
| 5,388,852 A | 2/1995 | Bigo et al. |
| 5,417,450 A | 5/1995 | Wang |
| 5,427,402 A | 6/1995 | Huang |
| 5,454,584 A | 10/1995 | Haut et al. |
| 5,460,398 A | 10/1995 | Huang |
| 5,472,224 A | 12/1995 | Jane Cabagnero |
| 5,478,102 A | 12/1995 | Huang |
| 5,511,441 A | 4/1996 | Arai |
| 5,524,503 A | 6/1996 | Ishikura |
| 5,549,311 A * | 8/1996 | Huang ..................... 280/47.38 |
| 5,605,409 A | 2/1997 | Haut et al. |
| 5,622,377 A | 4/1997 | Shamie |
| 5,645,293 A | 7/1997 | Cheng |
| 5,662,380 A * | 9/1997 | Tam et al. .................. 280/642 |
| 5,664,795 A | 9/1997 | Huang |
| 5,669,623 A | 9/1997 | Onishi |
| 5,676,386 A | 10/1997 | Huang |
| 5,718,444 A | 2/1998 | Huang |
| 5,722,682 A | 3/1998 | Wang |
| 5,727,798 A | 3/1998 | Walters et al. |
| 5,765,855 A | 6/1998 | Chiu |
| 5,765,856 A | 6/1998 | Kiser |
| 5,769,447 A | 6/1998 | Huang |
| 5,775,718 A | 7/1998 | Huang |
| 5,845,666 A | 12/1998 | Messner |
| 5,845,924 A | 12/1998 | Huang |
| 5,876,057 A | 3/1999 | Huang |
| 5,887,935 A | 3/1999 | Sack |
| 5,893,577 A * | 4/1999 | Takahashi .................. 280/642 |
| 5,938,229 A | 8/1999 | Chen et al. |
| 5,947,555 A | 9/1999 | Welsh, Jr. et al. |
| 5,954,404 A * | 9/1999 | Suzuki ...................... 297/467 |
| 5,979,928 A | 11/1999 | Kuo |
| 5,988,669 A | 11/1999 | Freese et al. |
| 6,070,890 A | 6/2000 | Haut et al. |
| 6,116,624 A | 9/2000 | Hu |
| 6,139,046 A | 10/2000 | Aalund et al. |
| 6,155,740 A | 12/2000 | Hartenstine |
| 6,241,274 B1 * | 6/2001 | Huang ....................... 280/642 |
| 6,273,451 B1 | 8/2001 | Julien et al. |
| 6,296,307 B1 * | 10/2001 | Holtke ..................... 297/250.1 |
| 6,318,807 B1 * | 11/2001 | Perego ................... 297/256.16 |
| D452,192 S | 12/2001 | Hartenstine et al. |
| 6,361,056 B1 * | 3/2002 | Chen et al. .............. 280/47.38 |
| 6,409,205 B1 * | 6/2002 | Bapst et al. ................. 280/642 |

* cited by examiner

FOLDABLE STROLLER WITH PASSENGER SUPPORT BASE

RELATED APPLICATIONS

This application is a continuation-in-part of U.S. patent application Ser. No. 09/567,096, filed May 8, 2000, now U.S. Pat. No. 6,478,327 the disclosure of which is incorporated herein by reference.

BACKGROUND

The invention relates to a foldable stroller and components of a stroller. In particular, the invention relates to a foldable stroller with a passenger support base or "seat pan."

Child carriages and child strollers (hereinafter called "strollers") are of different types and configurations. Such strollers typically include a child seat, fit to the stroller frame, to allow a child to be seated within the stroller. The child seat has a seat back portion and a seat cushion. The child seat can be made entirely of fabric and padding (hereinafter "fabric child seats"), or, alternatively, the child seat can comprise a stiffening board or plastic shell covered with fabric and padding ("semi-rigid child seats"). Fabric child seats provide less structural rigidity and can be less durable than their more rigid counterparts and, for that reason, are sometimes not desirable. Semi-rigid child seats have room for improvement, as well. In such child seats, fabric hangs over the front end of the seat shell and can clump or bunch up under the child's legs while a child is sitting in the stroller, thereby causing some level of discomfort to the child. The present invention addresses these disadvantages of child seats in conventional strollers.

SUMMARY OF THE INVENTION

The present invention is drawn to a stroller. According to one aspect of the present invention, the stroller can have a retractable canopy, which can be accomplished by mounting the canopy frame a seat support frame or basket frame extending rearwardly beyond the pivoting connection to the stroller rear legs. According to another aspect of the present invention, the stroller can have a remote hinge-lock actuator incorporated into an upper or parent tray formed between its push bar arms. According to another aspect of the present invention, the stroller can have an infant carrier securing mechanism that allows the infant car carrier to be attached to the stroller and provide at least two tilt positions.

A foldable stroller can comprise a foldable stroller frame convertible between an operating position and a folded position. The stroller frame can have front left, front right, rear left, and rear right legs, a handlebar frame pivotally connected to the rear left and right legs, and a seat support frame pivotally connected to the front left and right legs and rear left and right legs. The seat support frame has a portion that pivots downwardly when the frame is folded.

The stroller frame can further include left and right hinge locks fixedly mounted respectively to the rear left and right legs. The ends of the handlebar frame can be pivotally connected to the left and right hinge locks.

The stroller frame can further include a tray assembly comprising a front tray and left and right side arms connected to the front tray. The left and right side arms can be pivotally connected to the handlebar frame. The front and rear left and right legs can be pivotally connected to the left side arm, and the front and rear right legs can be pivotally connected to the right side arm.

The seat support frame can comprise a cross arm and left and right arms extending from the cross arm. The left arm is pivotally connected to the front left leg and the left hinge lock and the right arm is pivotally connected to the front right leg and the right hinge lock.

The push arms can be pivotally connected to the hinge locks. The left push arm and the left arms can be pivotally connected to the left hinge lock about a common axis, and the right push arm and the right arm are pivotally connected to the right hinge lock about a common axis. The left and right arms can extend rearwardly beyond the common axes of the left and right hinge locks. The portion of the seat support frame that pivots downwardly when the frame is folded can include the left and right arms extending beyond the common axes. The cross arm can connect the ends of left and right arms extending beyond the common axes.

The handlebar frame can comprise a handlebar and left and right push arms connected to the handle bar. Specifically, the handlebar can be pivotally connected to the left and right push arms respectively about left and right pivot assemblies. The handlebar can be pivotally movable to reduce the length of the handlebar frame during storage.

According to one aspect of the present invention, a canopy frame can be connected to the portion of the seat support frame that pivots downwardly so that as the stroller frame is folded, the portion of the seat support frame pivoting downwardly pulls the canopy frame downwardly. Specifically, the canopy frame can be pivotally connected to the left and right arms extending beyond the common axes. A portion of the canopy spaced furthest from the pivotal connection to the seat support frame can be positioned below the front tray, and can be positioned between the handlebar frame and the tray when the stroller is folded.

According to another aspect of the invention, the stroller or the stroller frame can include an upper tray mounted to the handlebar frame and a one-hand actuator for unlocking the left and right hinge locks mounted to the upper tray. The upper tray can have at least one container holding compartment and an opening for inserting operator's fingers. The actuator can be mounted to the underside of the upper tray for a movement between a pushed, actuated position and un-actuated position.

The stroller can further include left and right hinge-lock actuating members movably mounted to the left and right push arms and operatively connected respectively to the left and right hinge locks. The actuator can comprise a handle and left and right linkage assemblies connecting the handle to the left and right actuating members. Each of the left and right linkage assemblies can comprise a substantially U-shaped cross linkage and a push rod connected to the cross linkage. The cross linkage can have first, second, and third arms. The third arm can be pivotally journaled to the underside of the upper tray and join the first and second arms. The first arm can connect to one side of the handle and the second arm can pivotally connect to the push rod, which can connect to the respective left or right actuating member.

According to another aspect of the invention, the stroller can include an infant carrier securing mechanism connected to the handlebar frame, or alternatively, means for mounting an infant carrier in a rearwardly facing direction and providing at least two recline positions. The securing mechanism is adapted to engage front portions of the infant carrier to provide the two recline positions.

The securing mechanism can comprise a plurality of stops movably mounted to the left and right push arms. Each stop can be rotatably mounted between an engage position and a disengage position, which is rotated away from the engage position. There can be a pair of lower stops and a pair of upper stops, respectively mounted rotatably to the left and right push arms. The infant carrier can be adapted to engage the lower stops to provide a first recline position for the infant carrier and can be adapted to engage the upper stops and the lower stops to provide a second reline position, which can be more reclined than the first position.

Another aspect of the invention resides in a method of retracting a canopy of a stroller when it is folded, comprising providing a foldable stroller of the type described above and mounting a canopy frame to the portion of the seat support frame that pivots downwardly so that, as the stroller frame is being folded, the seat support frame pivoting downwardly pulls down the canopy frame.

In another aspect of the present invention, a stroller includes a child seat. The stroller has first and second front legs, first and second rear legs, and a seat support frame having first and second arms. The first arm is connected to the first front leg and the first rear leg, and the second arm is connected to the second front leg and the second rear leg. The stroller also has a passenger support base. The passenger support base is connectable to the first and second arms of the seat support frame. The passenger support base has a top surface, and the top surface has a trough provided therein. The stroller further includes a child seat having a seat cushion and a seat back support. A front portion of the seat cushion fits into and is secured in the trough.

The present invention also relates to a passenger support base for a stroller that includes a seat support frame. The passenger support base has a top surface having a trough provided at a front portion thereof. The passenger support base is adapted to attach to the seat support frame, and, when a child seat having a seat cushion with a front portion is mounted to the stroller, the front portion of the seat cushion fits into and is secured in the trough.

The present invention further relates to a child seat structure for attachment to a stroller frame. The child seat structure includes a child seat having a seat cushion and a seat back support. The seat cushion has a front portion with at least one tab affixed thereto. The child seat structure also includes a passenger support base attachable to the stroller frame. The passenger support base has a trough and at least one opening through the trough. The passenger support base also has at least one projection thereon, such that the at least one tab can pass through the at least one opening and connect to the at least one projection to secure the front portion of the seat cushion in the trough of the passenger support base.

BRIEF DESCRIPTION OF THE DRAWINGS

These and other features, aspects, and advantages of the present invention will become more apparent from the following description, appended claims, and accompanying exemplary embodiments shown in the drawings, which are briefly described below.

DETAILED DESCRIPTION

Although references are made here to directions in describing the structure, they are made relative to the drawings (as normally viewed) for convenience. The directions, such as left, right, upper, lower, inward, outward, etc., are not intended to be taken literally or limit the present invention in any form. Moreover, the numerical nomenclatures, first, second, third, fourth, etc., are used solely for purposes of tracking the structural elements. These numerical nomenclatures are not intended to be taken literally or to limit their associated elements.

Figure 1:
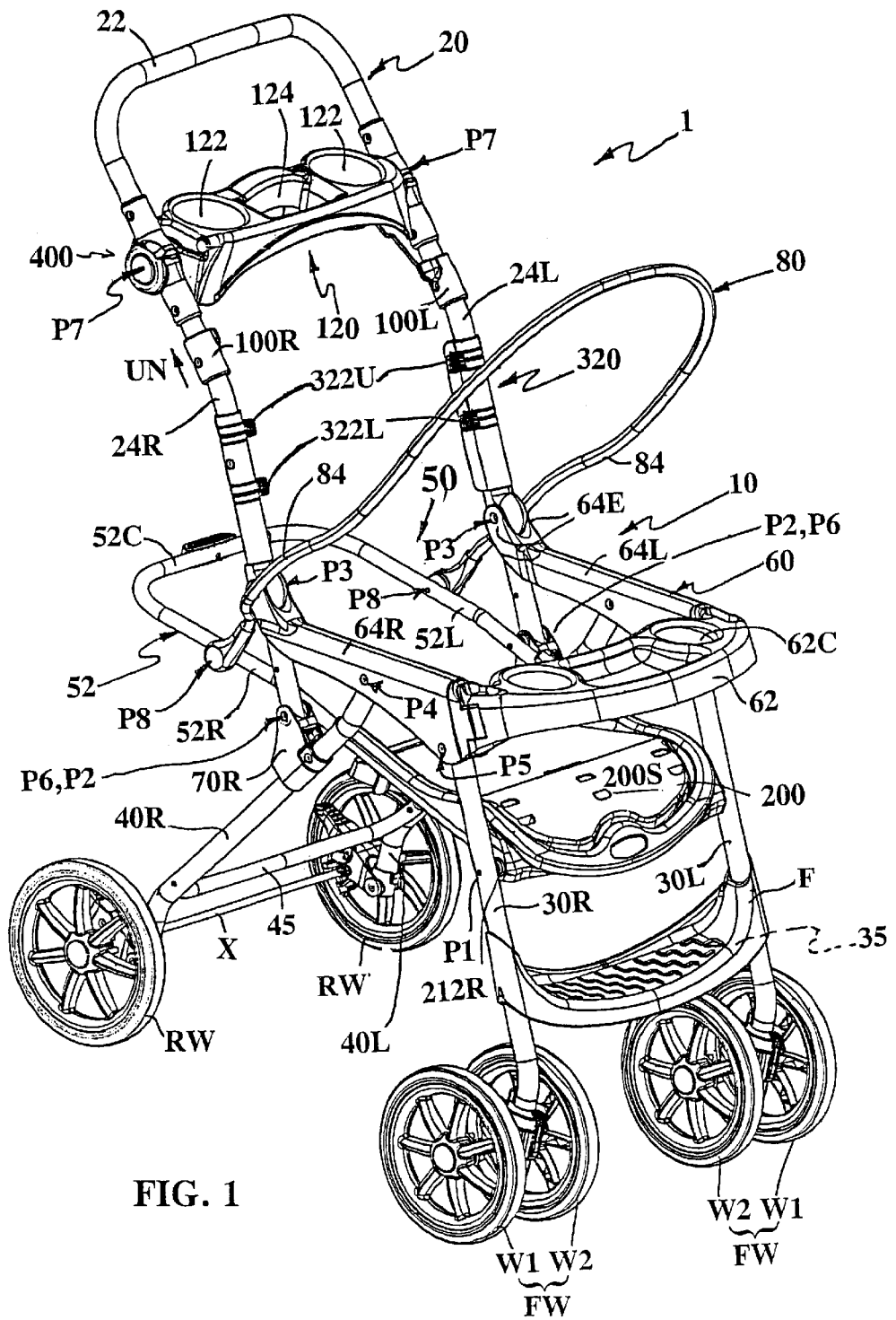
FIG. 1 is a perspective view of a foldable stroller in its operating position, with the soft goods removed to reveal a stroller frame.
Figure 1A:
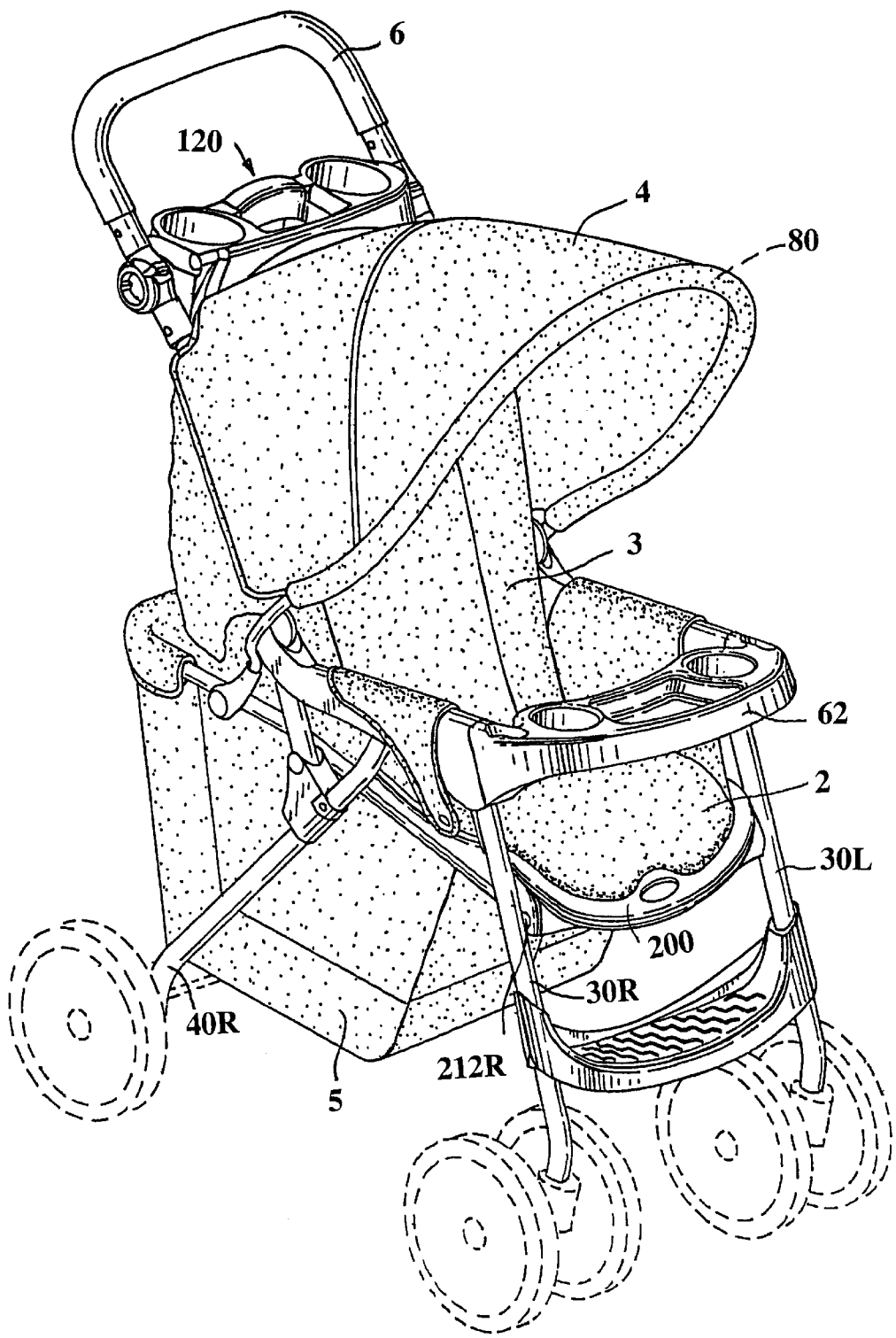
FIG. 1A is a perspective view a foldable stroller of FIG. 1 with the soft goods in place.

Referring to the figures, wherein like numerals indicate like parts, and in particular to FIG. 1, a perspective view of the foldable stroller 1 is shown according to one embodiment of the present invention. To more clearly reveal the stroller frame 10, the stroller 1 is shown without the associated "soft goods," such a seat cushion 2, seat back support 3, canopy 4, basket 5, hand grip 6, etc., which are typically made of cloth or plastic or both, or a flexible material. The stroller 1 with the soft goods in place is shown in FIG. 1A. The stroller 1 is generally intended for transporting children, but the inventive principles can be applied to all types of wheeled transports, including carts or carriages having a foldable frame.

Figure 2:
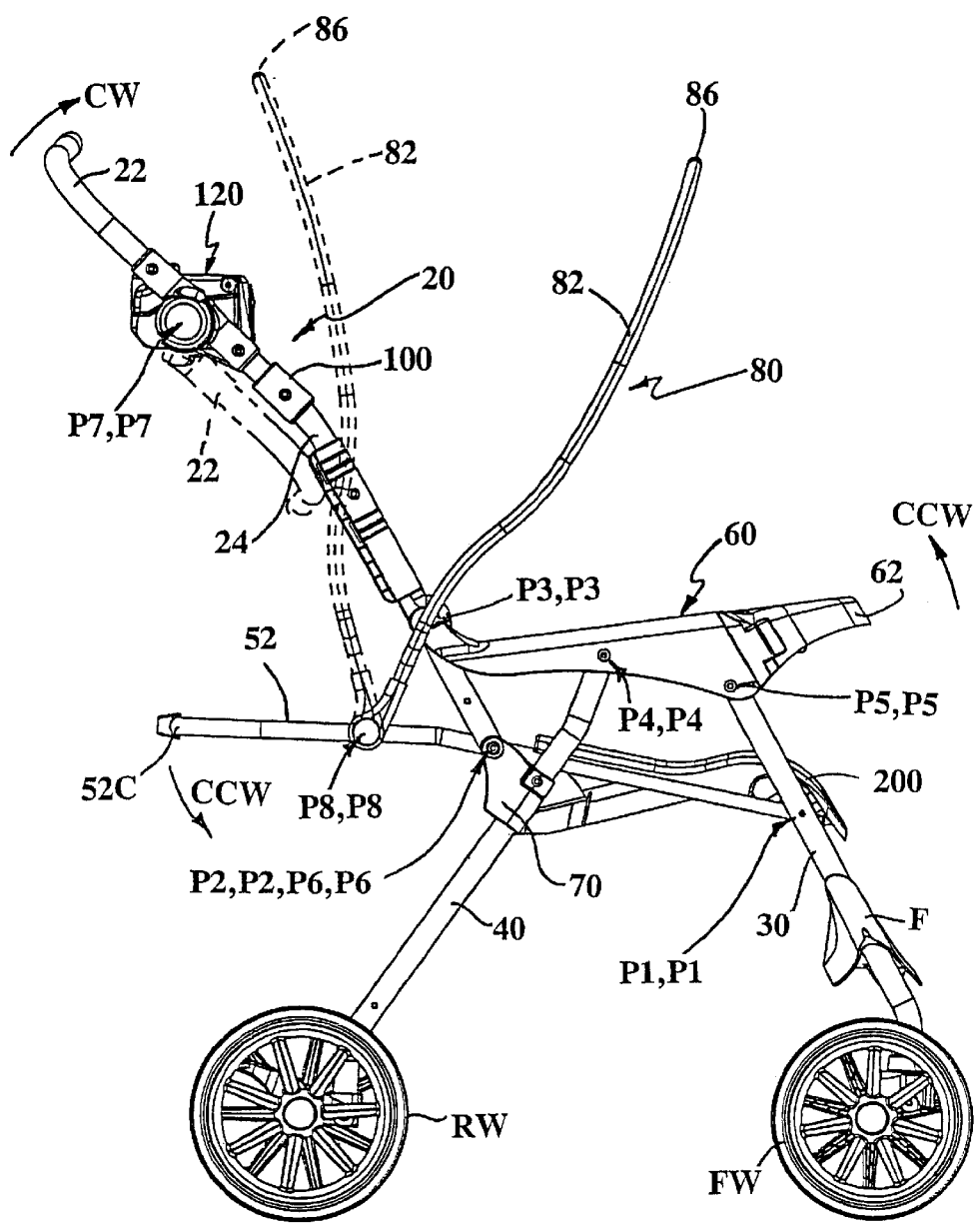
FIG. 2 is a side view of the foldable stroller of FIG. 1.
Figure 3:
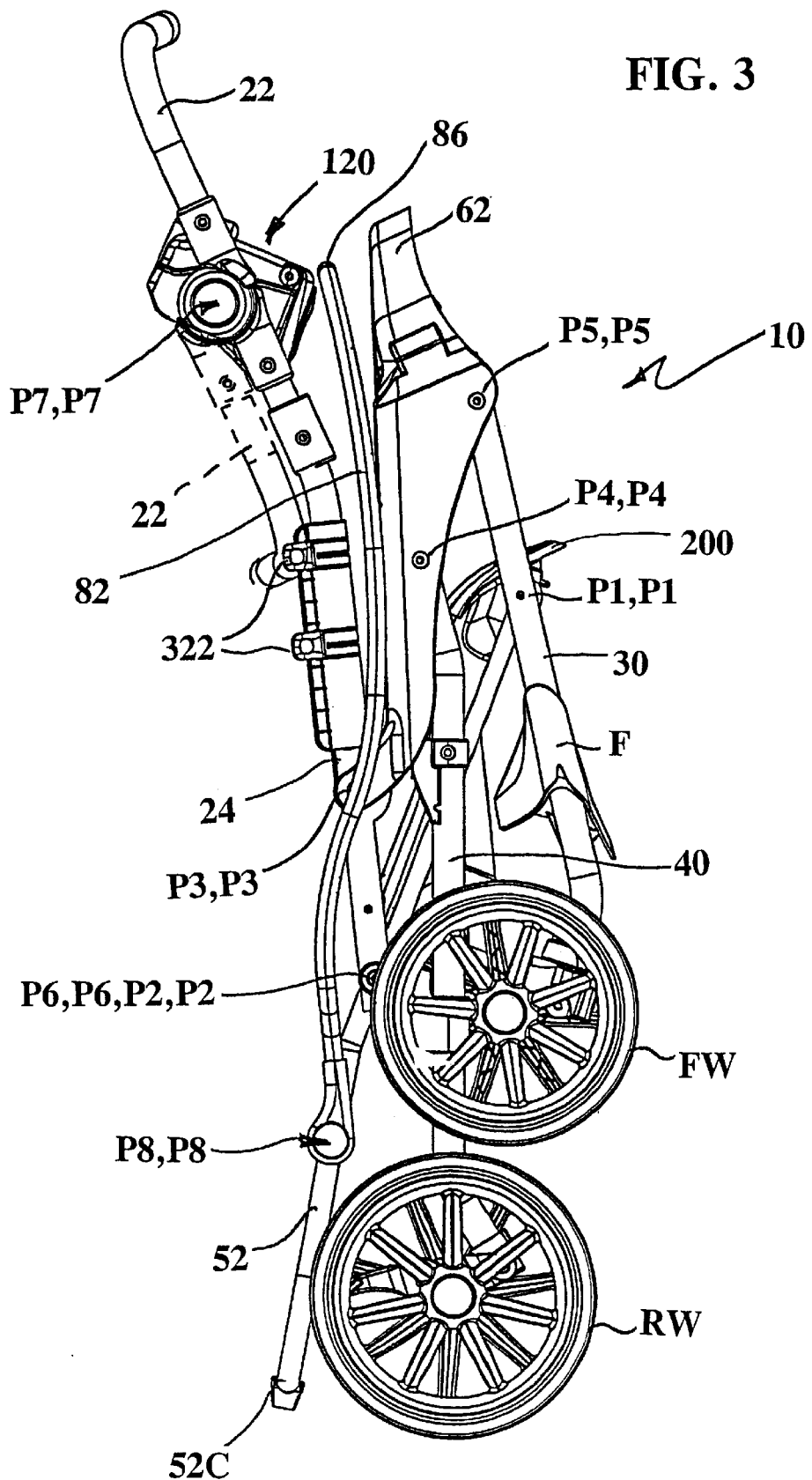
FIG. 3 is a side view of the foldable stroller of FIG. 1 in the folded position.

The stroller 1 includes a stroller frame 10 that is convertible between an operating or use position (shown in FIGS. 1, 1A, and 2), and a folded or stowed position (shown in FIG. 3). In the folded position, the stroller 1 is folded to a generally flattened configuration for storage. In the operating position, the stroller 1 is configured to receive and transport a passenger in a manner well understood by those skilled in the art.

Referring to FIGS. 1 and 2, the stroller frame 10 can have a basic fundamental frame configuration similar to those identified previously in U.S. Pat. Nos. 6,273,451; 6,155,740; 5,511,441; 5,181,735; and 4,953,887, the disclosures of which are incorporated herein by reference. The stroller frame 10 according the present invention includes a handlebar frame 20, legs 30R, 30L, 40R, 40L, a passenger support or frame 50, a child tray assembly 60, and a pair of hinge locks 70. In the drawings, a letter "P" or "Px" (where x represents a number) designates a pivotal connection, a pivot, or pivotal mount, or any conventional pivoting configuration, which can include pins, shaft, bolt, rivet, bearings, etc.

The handlebar frame 20 comprises handlebar 22 and right and left push arms 24R, 24L (collectively 24) extending from the handlebar 22. The handlebar 22 and the push arms 24 form a generally U-shaped frame. The handlebar 22 can be ergonomically configured for comfort, such as described in U.S. Pat. Nos. 5,454,584 and 5,605,409 issued to Haut, et al., the disclosures of which are incorporated herein by reference. The handlebar frame 20 can include an angle adjuster 400 for pivotally positioning the handlebar 22 relative to the push arms 24. The inner operative workings of the angle adjuster is omitted for brevity, particularly since any known angle adjuster can be used, such as the ones disclosed in aforementioned U.S. Pat. Nos. 5,184,835 is used to Huang and 5,056,805 issued to Wang, the disclosures of which are incorporated herein by reference. In the present embodiment, the angle adjuster 400 is adapted to provide a greater rotation capability so that the handlebar can be flipped over close to the push arms 24, as shown in phantom in FIG. 3.

The legs 30R, 30L, 40R, 40L can be described in terms of front legs 30, which include a front right (FR) leg 30R and a front left (FL) leg 30L, and rear legs 40, which include a rear right (RR) leg 40R and a rear left (RL) leg 40L. Each leg 30R, 30L, 40R, 40L has a lower end to which at least one rotatable wheel W is mounted. As shown, the front legs 30 each can have a pair of rotatable front wheels W1, W2 (collectively FW). The rear legs 40 can be reinforced with a cross brace 45, which extends between the rear wheels RW, above the rear wheel axle X. Similarly, the front legs 30 can be reinforced with a cross brace 35 (hidden inside the foot rest F) extending between the front wheels W.

The passenger support 50 includes a substantially U-shaped seat support frame 52. A back support (not shown), which can comprise a soft good (fabric) or frame type with a reclining latch (not shown), can be connected to the seat support frame 52.

A portion of the seat support frame 52 protrudes beyond the pivoting connection P2 of the rear legs 40 (or the hinge locks) to the support frame arms 52L, 52R, as shown in FIG. 2. A storage basket 5 or the like (shown in FIG. 2) can hang from the seat support frame 52, and hence the frame 52 is sometimes referred to as a basket frame. The basket 5 can be used to store various sundry items, including diapers, bottles, blankets, bibs, and other child-related items.

The seat support frame 52 has a cross arm 52C joined to left and right arms 52L, 52R. In other stroller frame embodiments, the passenger support can comprise left and right arms that each terminate at a location rearwardly of the rear legs 40R, 40L, such that the passenger support comprises the two arms in parallel with no cross arm, rather than a substantially U-shaped frame. The seat support frame arms 52L, 52R are pivotally mounted to the respective front legs 30L, 30R at pivots P1, and are pivotally mounted to the hinge locks 70 at pivots P2, as better illustrated in FIG. 2. The hinge locks 70 are fixedly mounted to the rear legs 40. Accordingly, the seat support frame arms 52L, 52R are operatively connected pivotally to the rear legs 40.

Passenger Support Base

The passenger support frame 50 can further include a passenger support base 200, preferably made of a plastic material, secured to the seat support frame arms 52L, 52R, as shown in FIG. 1. The seat cushion 2 can be attached to the passenger support base 200 and tucked into the passenger support base 200 so that the front portion of the seat cushion 2 does not become uncomfortably bunched up under the legs of the child seated on the seat cushion 2. In addition, the passenger support base 200 preferably has a contoured upper surface 200S, as seen in FIGS. 1 and 2, so that a child seated in the stroller can settle comfortably into the seat.

Attachment of the passenger support base 200 to the seat support frame 52 according to one embodiment of the invention will now be described with reference to FIGS. 1, 1A and 9–11. As shown in FIG. 1A, the left- and right-hand sides of the passenger support base 200 rest on seat support frame arms 52R, 52L of the seat support frame 52. In this regard, the seat support frame arms 52R, 52L provide support for the passenger support base 200 when a child is placed on the base 200.

Figure 10:
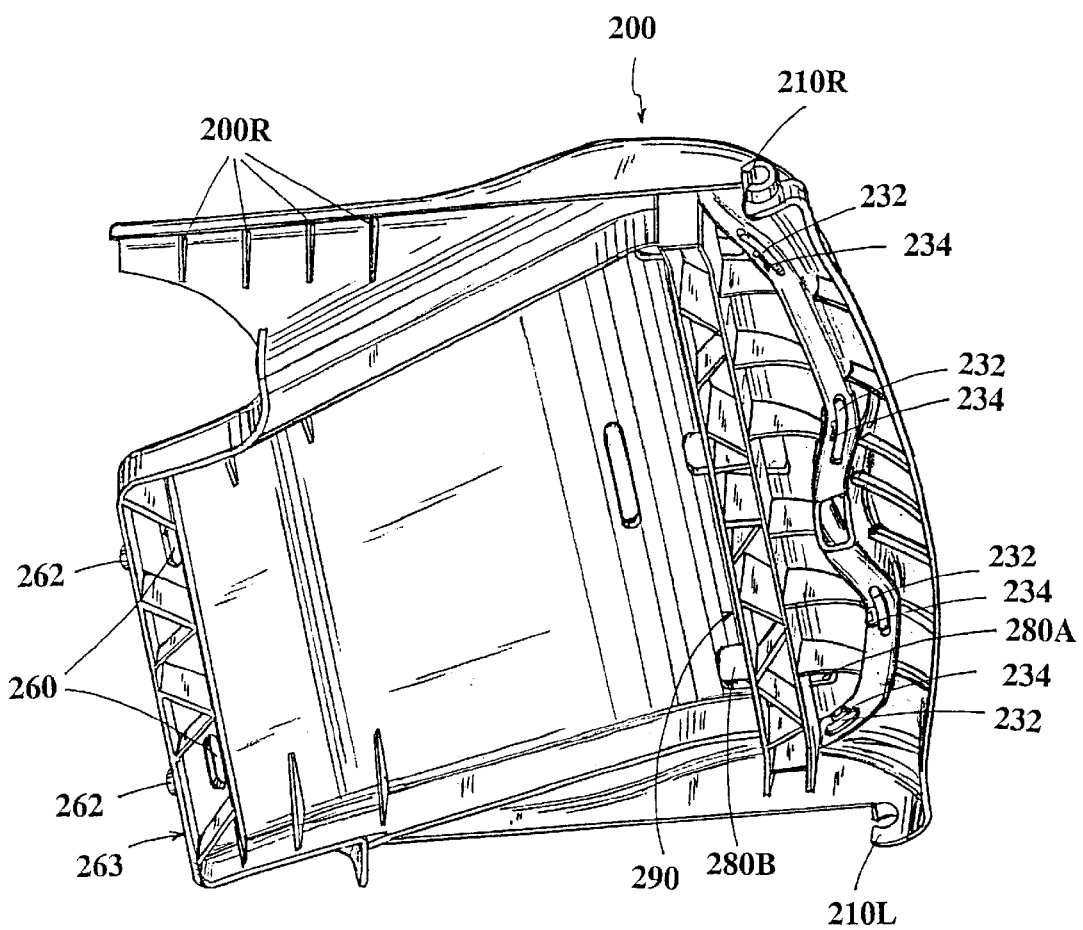
FIG. 10 is a bottom perspective view of the passenger support base.
Figure 11:
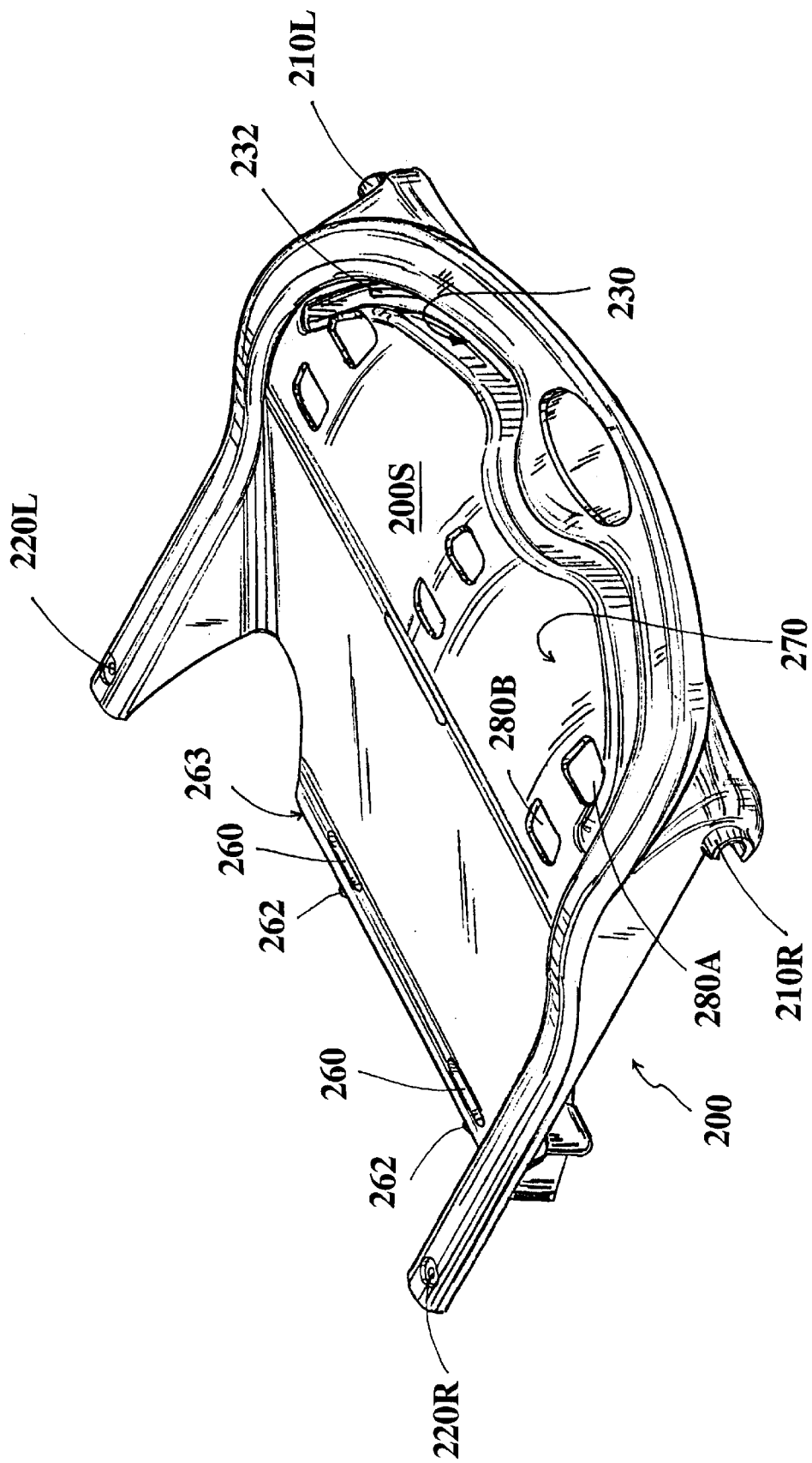
FIG. 11 is a top perspective view of the passenger support base.

As best seen in FIGS. 10–12, the passenger support base 200 has C-shaped clips 210R, 210L preferably located on either side of the front portion of the base 200. These C-shaped clips 210R, 210L can be clipped in place on pivot rods 212R, 212L (not shown) that extend between the seat support frame arms 52R, 52L and the front legs 30R, 30L at pivots P1. Pivots P1 allow the front legs 30R, 30L to pivot with respect to the seat support frame 52 and the attached passenger support base 200 when the stroller is collapsed or opened.

Figure 9:
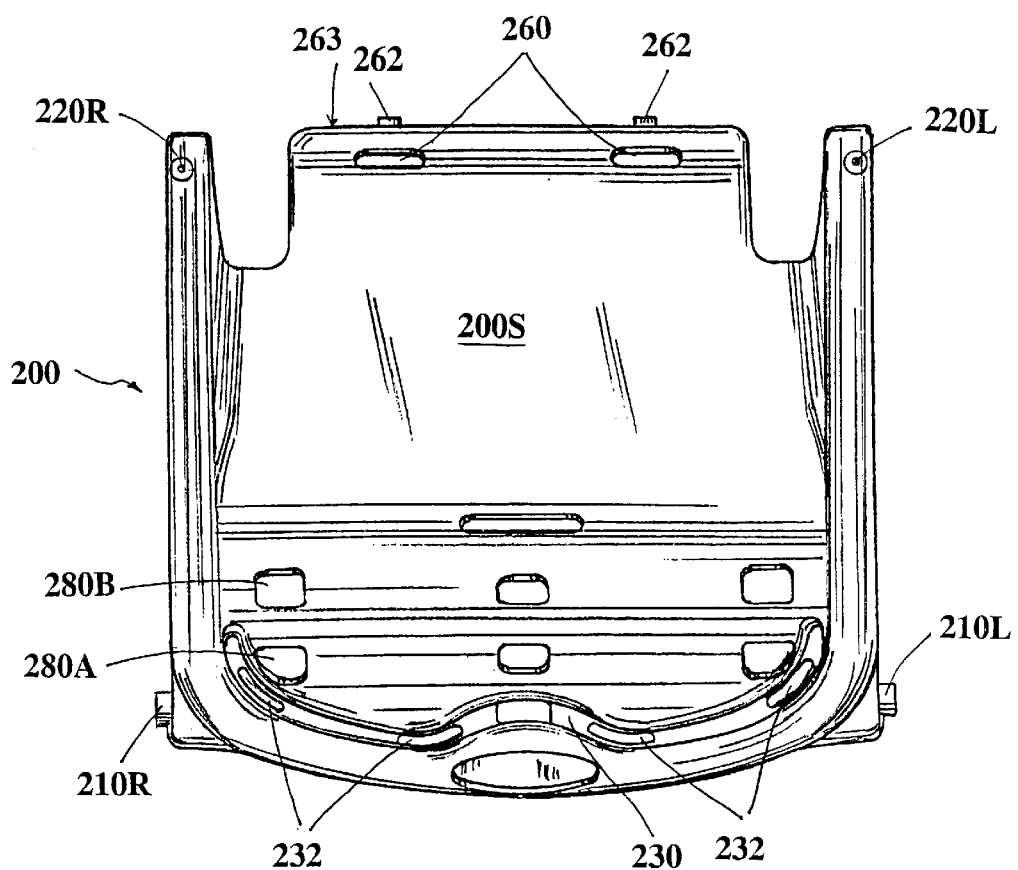
FIG. 9 is a top plan view of the passenger support base.

Referring now to FIGS. 9 and 11, the passenger support base 200 has two openings 220R, 220L on either side of the base 200 for receipt of a fastener, such as a screw or rivet, to attach the base 200 to the seat frame support arms 52R, 52L. The fasteners can be inserted into apertures in arms 52R, 52L that correspond to the openings 220R, 220L of the base 200. In this manner, the passenger support base 200 is rigidly held in place relative to the seat support frame 52. The attachment location is obscured in FIGS. 1, 2, 5, and 6 by the rear leg 40R. The underside of the passenger support base 200 also can include ribs 200R on either side that are configured to contact the seat frame support arms 52R, 52L, as best seen in FIG. 10. Besides providing structural integrity to the passenger support base 200, the ribs 200R, along with the clips 212R, 212L, keep the base 200 centered between and stable in relation to the seat support frame arms 52R, 52L.

The above-described arrangement for mounting the passenger support base 200 to the stroller frame represents one possible mounting arrangement. Those of skill in the art will recognize that the passenger support base 200 can be mounted to the stroller frame by other suitable conventional fasteners, for example, brackets and rivets, and at other stroller frame locations, for example, the front portion of the passenger seat support can be pivotally fastened directly to the front legs 30R, 30L.

The passenger support base 200 also includes a trough 230, which extends across a front portion of the top surface 200S of the seat pan 200. Although the trough 230 is shown in FIGS. 1, 9, and 11 in a curved shape, it will be understood that trough 230 can be formed linearly or in any desired shape. The trough 230 is preferably of a size between ½ inch to 1 inch in depth and between 8–12 inches in length.

Figure 7:
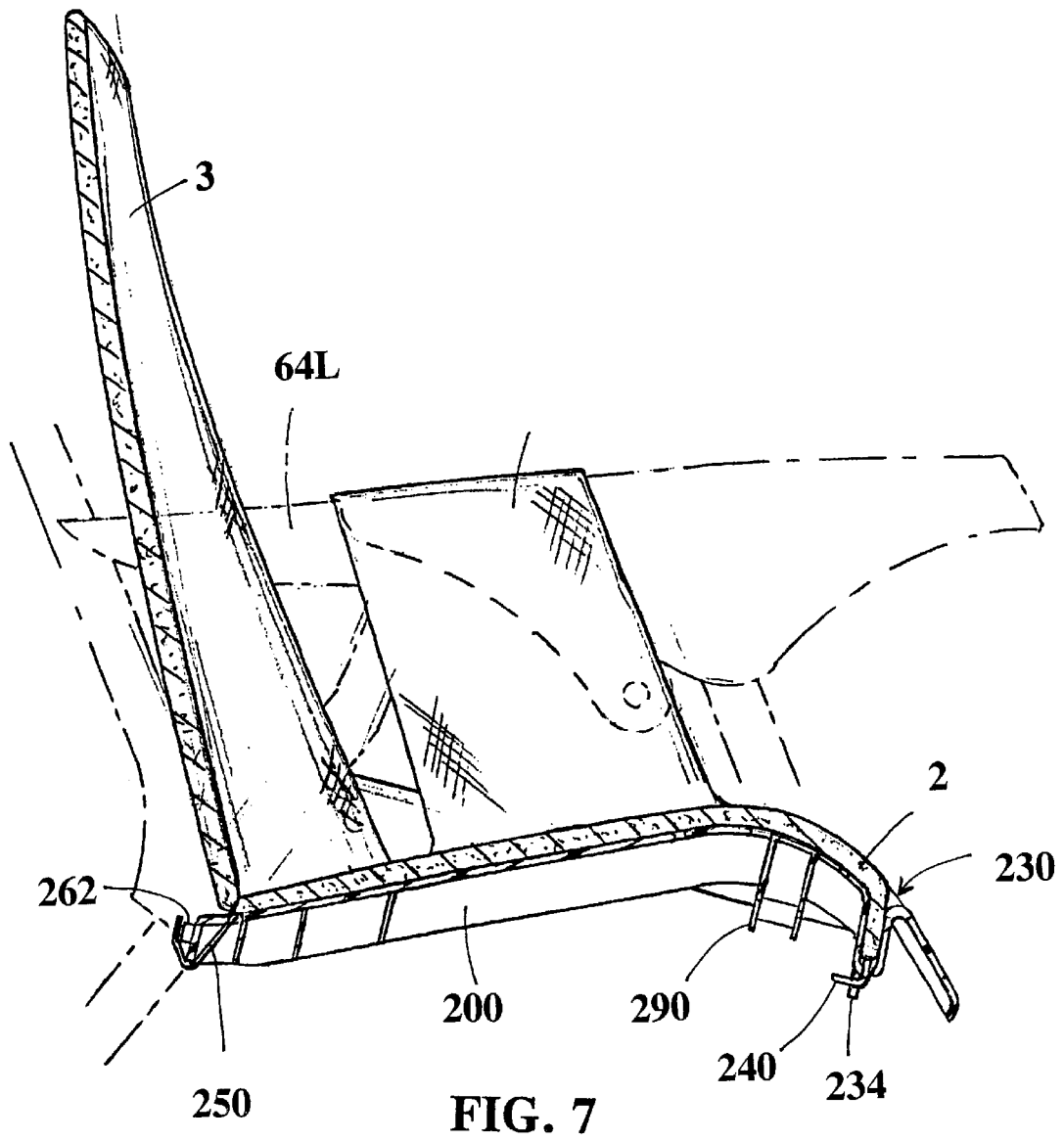
FIG. 7 is a side elevation view in partial cross section of a child seat mounted to the passenger support base, as generally taken along line 7—7 in FIG. 1A.
Figure 8:
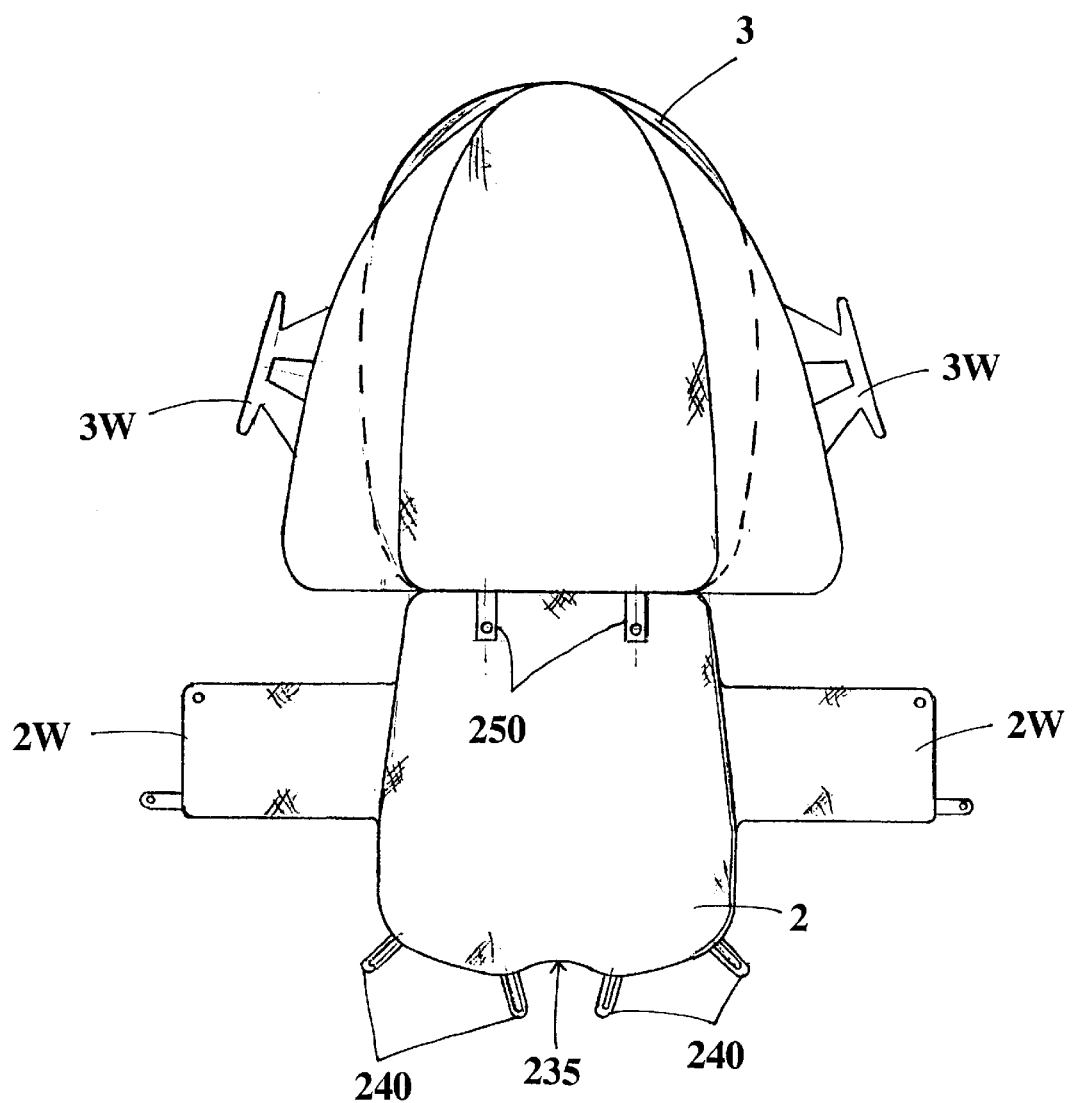
FIG. 8 is a back view of a seat cushion that can be mounted to the passenger support base.

The trough 230 has a plurality of spaced-apart holes, or openings, 232 located at a lowest portion of the trough 230, and small projections or teeth 234 that extend downward from the underside of the base 200 adjacent each hole 232. See in particular FIGS. 7 and 10. The trough 230 is provided to receive and to secure the front portion of the seat cushion 2 in place in the passenger support base 200. In this regard, the front edge 235 of the seat cushion 2 includes tabs 240, one tab 240 per hole 232. The tabs 240 can comprise plastic loops sewn into the front end of the seat cushion 2, for example, as seen in FIG. 8. The tabs 240 can be threaded through the holes 232 and looped over the respective projections 234 to hold the front edge of the seat cushion 2 in place in the trough 230. FIG. 7 shows a side view of the child seat with the front edge of the seat cushion 2 tucked into the trough 230 of the passenger support base 200 and with tab 240 looped over projection 234. When the tabs 240 are fit onto the projections 234, the seat cushion 2 is stretched fairly taut across the passenger support base 200, as seen in FIG. 1A. Thus, the child seat can be held in place on the stroller 1, firmly tucked into the passenger support base 200, in accordance with the present invention. Because the child seat, in particular the seat cushion 2, is stretched across the passenger support base 200, little, if any, bunching of the seat fabric occurs under the legs of a child placed in the stroller 1, which increases the child's comfort.

FIGS. 7–11 show an embodiment of the stroller which has four holes 232, four projections 234, and four tabs 240; however, those skilled in the art will recognize that the stroller can have more or fewer holes, projections, and tabs while remaining within the scope of the invention, for example, in other embodiments, the stroller can have between two and eight of each such structure.

The child seat can also include one or more straps 250 located on a back side of the child seat at the crease where the seat cushion 2 meets the seat back support 3, as seen best in FIG. 8. The passenger support base 200 can include corresponding slots 260 positioned to receive the straps 250. The straps 250 can be threaded through the slots 260 and attached to snaps or other fasteners 262 located on a back edge 263 of the passenger support base 200. When the straps 250 are attached via the slots 260 to the fasteners 262, the straps 250 keep the seat cushion 2 from sliding forward along the passenger support base 200.

The seat back support 3 can be secured to the stroller frame 10 in any manner known to those skilled in the art, for example, by fabric wings 3W located on either side of the back support 3. The wings 3W can be secured, for example, to the push arms 24R, 24L. In addition, the seat cushion 2 can include fabric wings 2W located on either side of the cushion 2. These fabric wings 2W can be secured, for example, to the arms 64R, 64L of tray 64.

To attach the child seat cushion to the stroller frame and the passenger support base 200, the wings 3W of the seat back support 3 are connected to push arms 24R, 24L. Likewise, wings 2W are mounted to arms 64R, 64L. The front edge 235 of the seat cushion 2 then can be inserted into the trough 230, and tabs 240 can be threaded through holes 232 in the trough 230 and pulled over the projections 234. Finally, the straps 250, which are threaded through slots 260, can be attached to fasteners 262 at the back edge 263 of the passenger support base 200. Once attached, the straps hold the child seat cushion in tension in place on the passenger support base 200. The child seat can be removed from the stroller frame and the passenger support base, if desired, for example, for washing, by performing the above steps in reverse order.

As mentioned above, the passenger support base 200 is contoured for the child's comfort. Referring to FIG. 11, the support base 200 has an upwardly facing, convex area 270 provided at the front portion of the support base 200. The child's legs can rest on this convex area 270. In other embodiments, the convex area 270 can be replaced by a flat area or area contoured other than convex.

The passenger support base 200 can be utilized in carriages and strollers of a type other than stroller frame 10. For example, the passenger support base can be employed on strollers having the frame configuration shown in U.S. Pat. No. 6,273,451, incorporated herein by reference, or in U.S. Pat. Nos. 6,155,740; 5,511,441; 5,181,735; and 4,953,887, the disclosures of which are incorporated herein by reference. In addition, the passenger support base 200 can be employed on dual strollers, jogging strollers, and any other child transport device, provided the stroller and devices include a frame structure to which the support base can attach.

In addition, where the passenger support base 200 is used on a stroller having a basket, such as basket 5 in FIG. 1A, the passenger support base 200 can include additional slots 280A, 280B to secure the basket 5 to the underside of the support base 200. More specifically, the front end of the basket 5 can have straps (not shown), similar to straps 250 of the child seat. The basket straps can be threaded upward through slots 280A and then downward slots 280, at which point the ends of the straps can be secured by snaps, clips, or other fasteners to a wall 290 located on the underside of the support base 200. The support base 200 thus provides additional structure from which to suspend the basket 5, which typically is suspended only from the seat support frame 52. The wall 290 also serves to reinforce support base 200.

The passenger support base 200 further can include slots (not shown) through which a child restraint system can be threaded.

Tray Assembly

The tray assembly 60, which can have a U-shaped configuration as shown in FIG. 1, comprises a tray 62 and left and right side arms 64L, 64R (collectively 64) pivotally connected respectively to the left and right push arms 24L, 24R at pivots P3. Specifically, referring to FIG. 1, the distal (rear) end of each of the side arms 64 has a pair of spaced ears 64E or the like that are spaced apart to receive the respective push arm 24L, 24R, and are held pivotally together with pivots P3. The tray 62, which can have one or more cup or container holding compartments 62C, can be either fixedly formed with the side arms 64, detachably mounted to the side arms 64, such as disclosed in U.S. Pat. No. 4,856,809, the disclosure of which is incorporated herein by reference, or pivotally connected or hinged to one side of the side arms 64L, 64R, while the opposite side can be latched to the other of the side arms 64L, 64R. In the third option, the tray 62 can also be rotatably mounted to the one side arms 64L, 64R, thus creating two axes of rotation. The tray 62 can be opened (pivoted along one substantially extending axis) and rotated about a second axis to tuck the tray 62 alongside the respective front legs 30R, 30L. Moreover, any conventional attaching means can be contemplated for detachably or movably attaching the tray 62 to the side arms 64.

The front and rear legs 30, 40 are pivotally mounted to the tray assembly 60. Specifically, the upper end of the front and rear legs 30, 40 are pivotally mounted to the respective side arms 64 with pivots P4, P5, respectively.

The hinge locks 70 (left 70L, right 70R) pivotally mount the handlebar frame 20 to the rear legs 40 at pivots P6. The hinge locks 70 can be any conventional hinge lock for maintaining a fixed position between the rear legs 40 and the handlebar frame 20 when locked, and for allowing pivotal motion therebetween when unlocked. For instance, the left and right hinge locks 70L, 70R each can be fixedly attached to and positioned between the ends of the respective rear leg 40L, 40R. The ends of the respective left- and right-side push arms 24 can be pivotally mounted to the respective hinge locks 70 at pivots P6 (which can share common pivots with pivots P2). To lock the handlebar frame 20 to the rear legs 40, each hinge lock 70 can include, for instance, a plunge or the like (not shown) that is movably mounted inside the handlebar frame 20, or a latch (not shown) that is pivotally mounted to the handlebar frame 20. The plunger can be biased inwardly into the respective hinge lock 70L, 70R or the latch can be biased to hook onto a fixed portion of the respective hinge lock 70L, 70R to lock the handlebar frame 20 to the rear legs 40. Alternatively, the hinge lock 70 can be configured as disclosed in previously mentioned U.S. Pat. No. 6,155,740, or U.S. Pat. No. 5,110,150 issued to Chen, the disclosures of which are incorporated herein by reference.

A pair of remote actuating members 100L, 100R (collectively 100) or the like can be operatively connected to the hinge locks 70, such as with a cable or rod (not shown). Each of the left and right actuating members 100L, 100R are slidably mounted to the respective left and right push arms 24L, 24R. Pulling each of the remote actuating members 100L, 100R upwardly along the respective left and right push arms 24L, 24R actuates the respective hinge lock 70L, 70R, e.g., moves the plungers upwardly into the push arms 24 or disengage the latch.

To unlock the stroller frame 10 from the operating position to the folded position, the operator can slide both remote actuating members 100 along the push arms 24 in the direction of arrow UN (see FIG. 2), which unlocks the hinge locks 70. Once the hinge locks 70 are unlocked, the stroller can be folded, for example, by pivoting the tray assembly 60 about the handlebar frame 20, in the counterclockwise direction CCW (FIG. 2), which raises the tray 62 upwardly to the folded position (FIG. 3), while lowering the cross arm (distal end portion) 52C of the seat support frame 52.

Upper Tray/Hinge Lock Actuator

Figure 4:
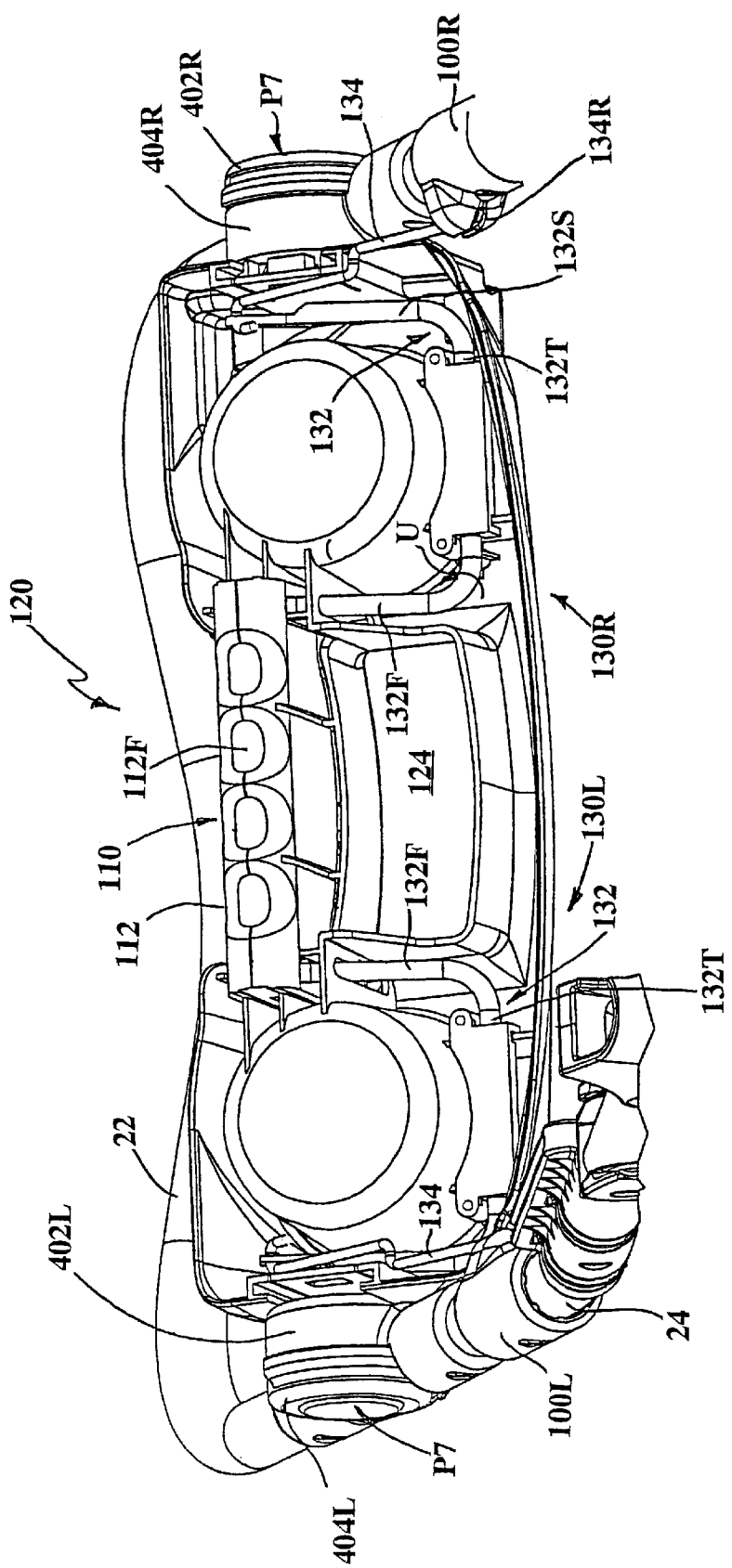
FIG. 4 is a detailed perspective view of a parent tray and a remote hinge-lock actuator.

Referring to FIG. 4, the stroller also can include a one-hand hinge-lock actuator 110, which is connected to the remote actuating members 100. According to one aspect of the present invention, the hinge-lock actuator 110 can be formed with an upper tray 120, which is connected to the handlebar frame 20. The upper tray 120 comprises at least one recessed compartment, such as a cup or container holding recess 122. The illustrated embodiment shows two cup or container holding compartments 122 and a through-hole 124, which permits the operator's hand or fingers to be inserted therethrough.

The tray 120 can be mounted to the push arms 24 or to the angle adjuster 400 about pivots P7. Specifically, the angle adjuster 400 can have a fixed pivot member 402L, 402R (collectively 402) extending from each upper end of the left and right push arms 24L, 24R and a movable pivot member 404L, 404R (collectively 404) extending from each lower end of the handlebar 22. The fixed pivot members 402 are positioned facing each other, i.e., positioned inwardly of the respective movable pivot members 404. The fixed pivot members 402 can have tracks, sockets, or any mechanical connectors that can receive complementary mating parts formed on the left and right sides 120L, 120R of the tray 102.

The remote hinge-lock actuator 110 comprises a handle 112 and left and right linkage assemblies 130L, 130R (collectively 130). The handle 112 is mounted for a movement between an actuated or pushed position, which pulls up the actuating members 100 to release the hinge locks 70, and a non-actuated or locked position, where the actuating members 100 are at their normal, down position (hinge locks 70 remain locked). The handle 112 can be biased toward the non-actuated (locked) position, and can include finger contours 112F. Either hand of the operator can be inserted into the through-hole 124 so that the fingers loop around the finger contours 112F. To actuate or release the hinge locks 70, the operator presses or pulls up the handle 112 with his or her fingers.

Still referring to FIG. 4, the right and left linkage assemblies 130L, 130R are substantially identical, mirror images of each other. Each of the right and left linkage assemblies 130L, 130R comprises a cross linkage 132 connected to a push rod 134. The cross linkage 132 is substantially U-shaped, having a first arm 132F and a second arm 132S spaced from the first arm 132F and joined by a third arm 132T. The first arm 132F is connected to one side of the handle 112 and the second arm 132S is pivotally connected to the push rod 134. The third arm 132T is pivotally journaled to the underside of the tray 120. Actuating the handle 112 simultaneously rotates the left and right cross linkages 132 in the direction of the arrow U (pivots toward the upper side of the tray 120). One end of the push rod 134 is pivotally connected to the free end of the second arm 132S, and the other end is pivotally secured to the respective actuating members 100L, 100R. In this respect, each of the actuating members 100L, 100R has a push rod receptacle 134R configured to receive and hook (or latch) onto the respective push rod 134. As the operator pushes the handle 112, both the left and right cross linkages 132 rotate, which pull up the respective left and right push rods 134, and thus the actuating members 100L, 100R and allow the handlebar frame 20 to pivot relative to the hinge locks 70.

Canopy Frame

According to another aspect of the present invention, the stroller includes a canopy support rod or frame 80 attached to the seat support frame or basket frame 52 at pivots P8. The frame 80 comprises one or more substantially U-shaped canopy bows 82 (only one shown) that support a canopy and pivotally or movably attached to the set support frame 52. In this respect, any conventional bow mounting system can be used. The canopy frame 80 can be moved between a use position (solid in FIG. 2) for shading a passenger and a stow position (phantom in FIG. 2) where it is pulled close to the handlebar frame, away from the passenger. The canopy bow(s) 82 is pivotally attached at the pivots P8, which is located on the portion 52B of the seat support frame extending beyond the pivots P2, P6. In this respect, the canopy bow 82 can have outwardly extending bulge 84 to provide clearance for the push arms 24.

When the stroller is being folded from the operating position shown in FIG. 2 to the folded position shown in FIG. 3, the distal end (cross arm 52C) of the seat support frame 52 rotates counterclockwise CCW, toward the rear wheels RW, while the handlebar frame 20 rotates clockwise CW. This lowering action of the support frame 52 retracts the bow 82 downwardly and automatically positions the bow 82 close to the handlebar frame 20. It should be noted that the canopy 4 can be mounted around the handle frame 20. Thus, moving the handlebar frame 20 pivots the canopy frame 80 to the position shown in phantom when the stroller is folded. But because the canopy frame 80 is retracted when the stroller is fully folded (FIG. 3), the bow 82 is tucked in between the handlebar frame 20 and the tray assembly 60.

The area (crest) 86 of the bow furthest from the pivots P8 can be located higher than the handlebar 22, as shown in FIG. 2 when the stroller is in the operating position. Nonetheless, because of the present unique mounting of the canopy frame 80, the crest 86 of the bow can extend well below the handle bar 22, as shown in FIG. 3. In this respect, it is preferable for the crest 86 to be positioned inwardly from the front end of the tray to protect the canopy 4.

It is further desirable to make the stroller as compact as feasible when it is folded. According to the present invention, the handlebar 22 is made foldable about the pivots P8 as shown in phantom in FIG. 3. By pivoting the handlebar 22 in the counterclockwise direction, the handlebar 22 is no longer the highest or longest point of the folded stroller, and the overall length of the folded stroller can be considerably reduced.

Infant Carrier Mount

Figure 5:
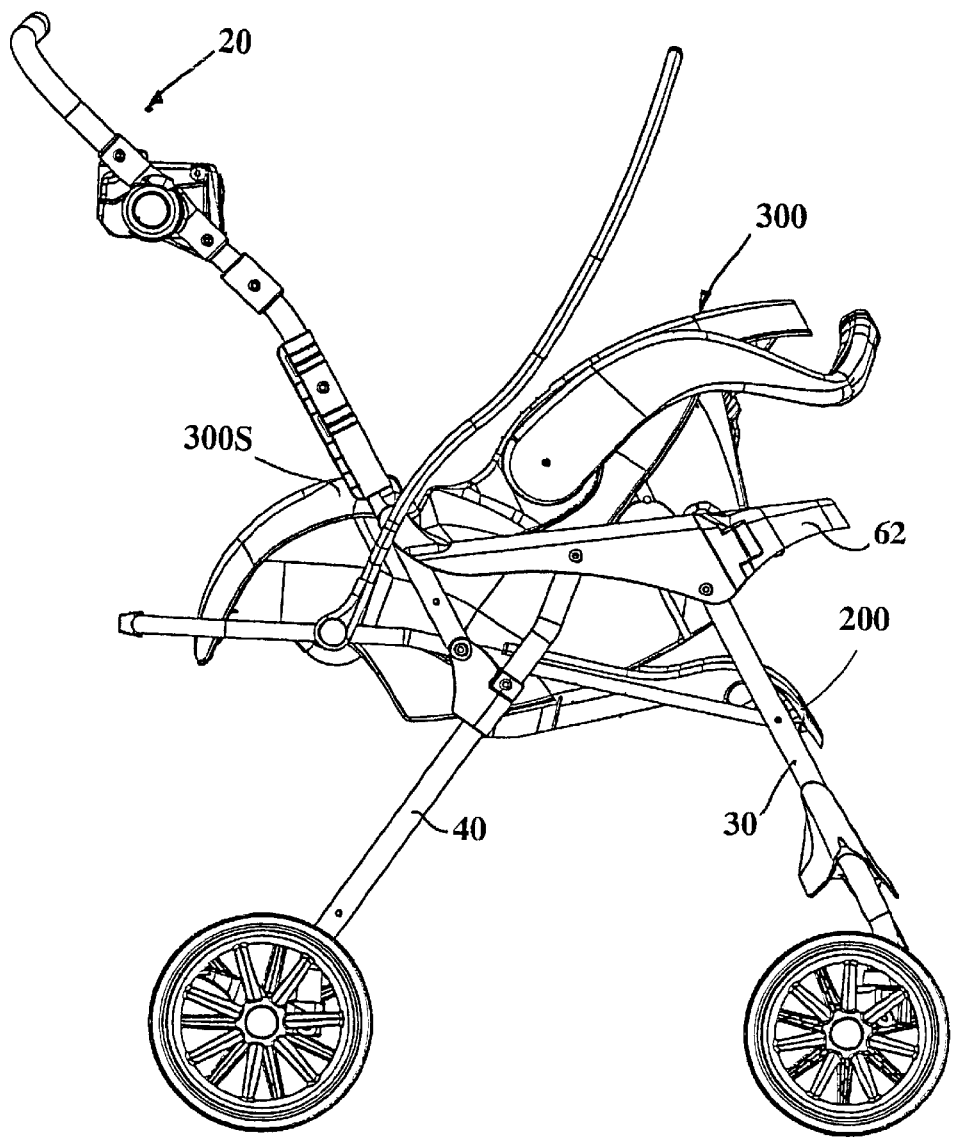
FIG. 5 is a side view of the foldable stroller of FIG. 1, with an infant car carrier mounted thereto and positioned at an infant upright position.
Figure 6:
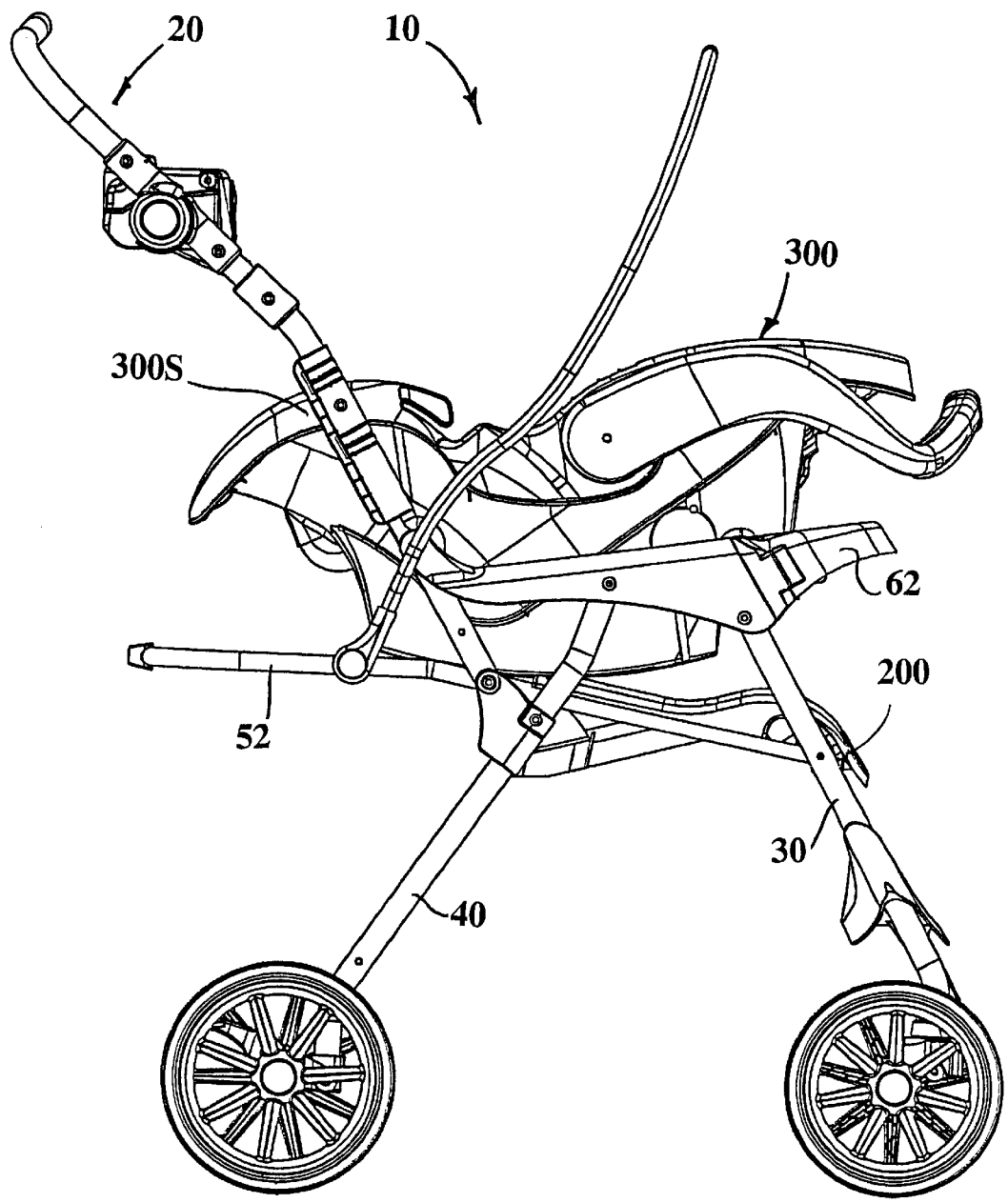
FIG. 6 is a side view of the foldable stroller of FIG. 1, with the infant carrier mounted thereto and positioned at an infant reclined position.

FIGS. 5 and 6 illustrate the present stroller 1 with an infant carrier 300 mounted thereto. The presence of the passenger support base 200 thus does not prevent the stroller from converting from a toddler's stroller (see FIGS. 1, 1A) to an infant's stroller (see FIGS. 5–6). According to another aspect of the invention, the stroller 1 provides at least two tilt positions, reclined and upright, while the infant carrier is rearwardly facing. In this respect, the infant carrier 300 can be mounted to the tray as described in U.S. Pat. No. 6,070,890, the disclosure of which is incorporated herein by reference. That is, the front tray 62 can have a notch or the like (not shown) that can latch onto a retractable catch or the like (not shown) formed on the underside of the infant carrier. The handle bar frame 20 carries infant carrier securing mechanism 320, which comprises a plurality of abutments or stops 322 (322U, 322L) rotatably mounted to the left and right push arms 24L, 24R. The stops 322 are rotatable between an engage position shown in FIG. 1 and a disengage position rotated away from the engage position. The present embodiment has four stops, a pair of lower stops 322L and a pair of upper stops 322U.

Referring to FIG. 5, the carrier 300 is seated so that it is rearwardly facing (facing the caregiver) and is positioned in an upright position. In this position, the lower stops 322L are rotated to the engage position to abut the upper front left and right sides 300S of the infant carrier. The lower stops 322L are rotated toward each other after the infant carrier 300 is placed in position. In this position, the front part of the infant carrier 300 is supported by the passenger support base 200 (and the associated seat cushion 2 and the lower stops 322L), and the lower stops 322L confine the infant carrier from being lifted upwardly.

Referring to FIG. 6, to position the infant carrier in the more reclined position, the lower stops 322L are rotated so that they face each other, as shown in FIG. 1. The infant carrier 300 rests on the front tray 62 and the lower stops 322L. Once the infant carrier 300 is positioned, the upper stops 322U are rotated so that they abut against the upper surface of the upper front left and right sides 300S of the carrier. The lower stops 322L prevent the infant carrier 300 from moving downwardly to the seat 2 and the upper stops 322U prevent the infant carrier 300 from being lifted upwardly. This thus keeps the carrier locked onto the stroller.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

What is claimed is:

1. A stroller comprising:

a stroller frame having first and second front legs, first and second rear legs, and a seat support frame having first and second arms, the first arm connected to the first front leg and the first rear leg, and the second arm connected to the second front leg and the second rear leg;

a passenger support base connectable to the first and second arms of the seat support frame, the passenger support base having an upper surface, the upper surface having a trough provided therein; and a child seat having a seat cushion, the seat cushion having a front portion that fits into and is secured in the trough, wherein the stroller has a first pivot rod extending between the first front leg and the first arm and a second pivot rod extending between the second front leg and the second arm, and the passenger support base has first and second clips on opposite sides of the front portion thereof, the first clip attachable to the first pivot rod and the second clip attachable to the second pivot rod.

2. A stroller comprising:

a frame having first and second front legs, first and second rear legs, and a seat support frame having first and second arms, the first arm pivotally connected to the first front leg and the first rear leg, and the second arm pivotally connected to the second front leg and the second rear leg;

a passenger support base connectable to the first and second arms of the seat support frame, the passenger support base having an upper surface, a bottom surface with at least one projection downwardly depending therefrom, and an opening therethrough; and a seat cushion having a front portion, the front portion having a front edge with at least one tab, the seat cushion configured to be secured to the passenger support base so that the front portion extends into the opening from the upper surface toward the bottom surface, and the at least one tab attaches to the at least one projection.

3. The stroller according to claim 2, wherein the at least one projection comprises four, spaced projections downwardly depending from the bottom surface of the passenger support base, and the at least one tab comprises four, spaced tabs on the front edge of the front portion of the seat cushion for attachment to the four, spaced projections, respectively.

4. The stroller according to claim 3, wherein the passenger support base includes four openings there through, and the four, spaced tabs are located on the front edge to align with the four openings.

5. The stroller according to claim 2, wherein the at least one projection depends downwardly from the bottom surface directly adjacent the opening.

* * * * *